US006666177B1

(12) United States Patent
Stiebels et al.

(10) Patent No.: US 6,666,177 B1
(45) Date of Patent: Dec. 23, 2003

(54) METHOD FOR OPERATING AN INTERNAL COMBUSTION ENGINE COMPRISING AT LEAST ONE WORKING PISTON

(75) Inventors: Bernd Stiebels, Adenbüttel (DE); Ekkehard Pott, Gifhorn (DE); Leo Spiegel, Gifhorn (DE)

(73) Assignee: Volkswagen AG (DE)

( * ) Notice: Subject to any disclaimer, the term of this patent is extended or adjusted under 35 U.S.C. 154(b) by 0 days.

(21) Appl. No.: 10/111,200

(22) PCT Filed: Sep. 22, 2000

(86) PCT No.: PCT/EP00/09281

§ 371 (c)(1), (2), (4) Date: Apr. 22, 2002

(87) PCT Pub. No.: WO01/29385

PCT Pub. Date: Apr. 26, 2001

(30) Foreign Application Priority Data

Oct. 21, 1999 (DE) ........................................ 199 50 682

(51) Int. Cl.[7] ................................................ F02D 13/02

(52) U.S. Cl. .................................. 123/48 R; 123/78 R

(58) Field of Search ............................ 123/48 R, 48 A, 123/45 AA, 48 B, 48 C, 48 D, 316, 78 R, 78 A, 78 AA, 78 B, 78 BA, 78 C, 78 D, 78 E, 78 F; 711/111

(56) References Cited

U.S. PATENT DOCUMENTS 4,739,968 A 4/1988 Schabinger
4,834,031 A * 5/1989 Katoh et al. .............. 123/48 R
5,076,235 A * 12/1991 Nagel et al. ........... 123/406.33
5,088,044 A * 2/1992 Matsuura ...................... 70/111
5,123,388 A * 6/1992 Kanesaka .................. 123/316
5,183,013 A 2/1993 Ito et al.
5,255,637 A * 10/1993 Schechter ................. 123/48 R
6,039,026 A * 3/2000 Shiraishi et al. ............ 123/399
6,125,801 A * 10/2000 Mendler ................... 123/48 R
6,135,086 A * 10/2000 Clarke et al. ............... 123/316
6,553,949 B1 * 4/2003 Kolmanovsky et al. ... 123/48 B

FOREIGN PATENT DOCUMENTS

DE 36 07 798 9/1987
DE 40 30 768 4/1991
DE 41 08 454 10/1991
DE 40 28 594 3/1992
DE 42 27 699 2/1994
DE 197 36 131 10/1998
DE 198 47 851 4/1999
DE 198 07 488 9/1999
DE 19807488 C * 9/1999 ........... F02D/13/02
EP 568 214 11/1993
JP 63016137 A * 1/1988 ............ 123/78 BA

* cited by examiner

*Primary Examiner*—Willis R. Wolfe
(74) *Attorney, Agent, or Firm*—Ostrolenk, Faber, Gerb & Soffen, LLP

(57) ABSTRACT

A method for operating an internal combustion engine with at least one working piston with a variable compression ratio, which can be changed as a function of an operating state of the internal combustion engine, the method including the steps of: detecting, with a knock sensor, when the compression ratio is too high; reducing the compression ratio (V) when the knock limit (L) is at least reached by a first, predetermined value (V1), which is a function of the operating state, over a first, predetermined time period ($t_1-t_0$); subsequently increasing the compression ratio (V) by a second, predetermined value (V2) over a second, predetermined time period ($t_2-t_1$) until the knock limit (L) is at least reached again; and determining at least one of the first predetermined value (V1), the first time period ($t_1-t_0$), the second predetermined value (V2), and the second time period ($t_2-t_1$) as a function of load demand on the internal combustion engine.

6 Claims, 1 Drawing Sheet

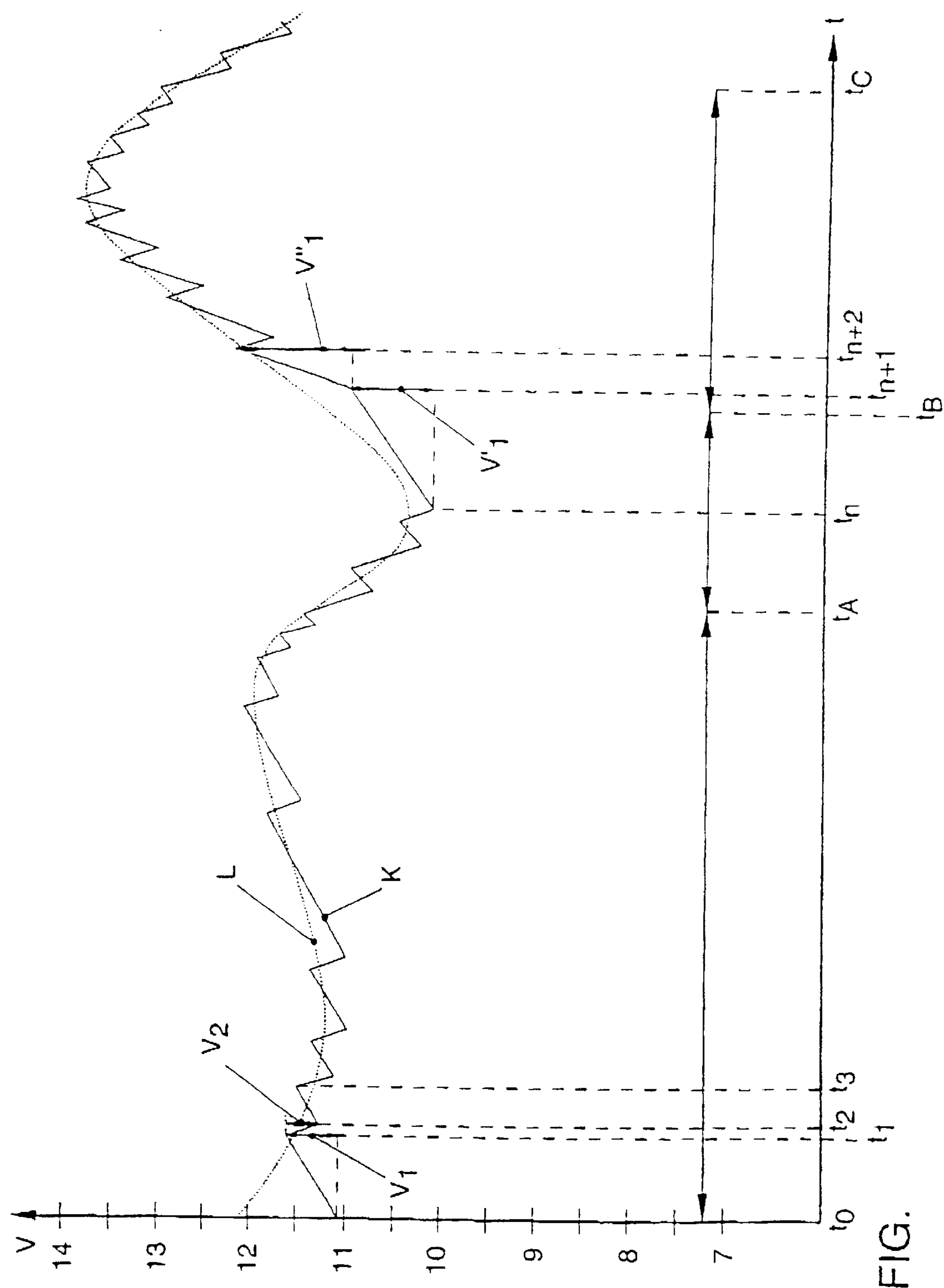
FIG.

METHOD FOR OPERATING AN INTERNAL COMBUSTION ENGINE COMPRISING AT LEAST ONE WORKING PISTON

PRIORITY CLAIM

This is a U.S. national stage of application No. PCT/EP00/09281, filed on Sep. 22, 2000. Priority is claimed on that application and on the following application:

Country: Germany, Application No.: 199 50 682.5, Filed: Oct. 21, 1999.

BACKGROUND OF THE INVENTION

The invention pertains to a method for operating an internal combustion engine with at least one working piston with a variable compression ratio.

A device by means of which the closing point of the intake valve of an internal combustion engine can be varied, so that the compression ratio can be varied as a function of the operating state of the internal combustion engine, is known from DE 4,108,454 C2. A knock sensor, which is mounted on the engine housing in the known internal combustion engine, is provided to detect when the compression ratio is too high. When the knock sensor responds, thus signaling that the compression ratio is too high, an adjusting mechanism changes the closing time of the intake valve. When the operating state changes again in such way that it is possible for a higher compression to be used, provision is made in the known internal combustion engine for detecting the temperature of the wall of the combustion chamber. When this temperature is below a predetermined value, the closing time of the intake valve can be changed, as a result of which the compression ratio is increased again. The disadvantage of this internal combustion engine is that the open-loop or closed-loop control system functions relatively slowly, especially when the compression ratio is to be increased, because the temperature of the wall of the combustion chamber changes relatively slowly, i.e., the temperature detection process is relatively slow.

A method for operating a four-cycle internal combustion engine is known from DE 198-04,988 C1. The compression ratio is varied by changing the opening and closing time of the intake and/or outlet valve. So that the compression ratio can be adjusted to the optimum value, various sensors are provided to monitor the combustion process. For example, an ion current sensor is provided inside the combustion chamber. In addition, a knock sensor, designed as a structure-borne sound sensor, is attached to the engine housing. It is found that, because of the large number of sensors, especially in the case of multi-cylinder engines, it is necessary to process or evaluate large amounts of sensor data. The electronic circuitry, i.e., the control mechanism, must therefore be relatively complicated.

It is therefore the task of the invention to provide a method for operating an internal combustion engine with at least one working piston, which method does not suffer from the disadvantages mentioned above.

This task is accomplished by a method for operating an internal combustion engine with at least one working piston, which method has the features stated in claim 1. This internal combustion engine has a variable compression ratio, which can be changed as a function of the operating state of the internal combustion engine, a knock sensor being used to detect when the compression ratio is too high, so that the compression ratio can then be lowered below the knock limit. According to the invention, the process is characterized in that, when the knock limit is reached or exceeded, the compression ratio is reduced by a first, predetermined value, which is a function of the operating state, over a first, predetermined time period, and in that the compression ratio is then increased by a second, predetermined value over a second, predetermined period of time until it reaches or exceeds the knock limit. The decrease in the compression by the first value and/or the increase in the compression by the second value preferably occurs in a continuously falling manner. A graphic depiction on a two-axis orthogonal coordinate system, in which the compression ratio is plotted versus time, yields a graph of the compression ratio in the form of a sawtooth-like curve. The compression ratio is lowered and then raised again as a function of time by specific, predetermined values, which depend on the operating state of the internal combustion engine. The compression ratio therefore "oscillates" continuously around the knock limit or stays below it. Because the compression ratio therefore is continuously being raised and lowered in the area of the knock limit, the maximum possible compression ratio is always obtained, no matter what the operating state of the internal combustion engine. It is advantageous in this method that only the measurement values of the knock sensor need to be evaluated, which means that complicated combustion monitoring sensors inside the combustion chamber are not required. In addition, the effort which must be make to implement the closed-loop or open-loop control of the system is simplified, because only the signal of the knock sensor must be processed.

SUMMARY OF THE INVENTION

It is provided in accordance with a further elaboration that the first value and/or the first time period is determined as a function of the load demand on the internal combustion engine. The first value and/or the first time period will be different, depending on the load range in which the internal combustion engine is operating, so that, overall, the sawtooth course of the compression ratio curve will be composed of steeper or flatter sections, when seen on the coordinate system.

If, therefore, it can be recognized under dynamic operating conditions, that is, under conditions of changing loads, that the compression ratio must be decreased quickly as a result of a sudden high load demand, the first value and/or the first time period and/or the second value and/or the second time period must be changed in order to meet the demand for a rapid decrease in compression. It can therefore be provided that the first value is increased and/or the first time period decreased in order to achieve a rapid decrease in compression, which will then be followed by an increase in compression. If, for example, the knock sensor responds again within, especially at the end of, the first time period, the first value by which the compression is decreased is increased, and it keeps being increased until the knock sensor no longer responds within the first time period. Then the first value is set back to its baseline value, which depends on the operating state.

If, under dynamic operating conditions, the compression ratio is to be increased quickly as a result of a sudden drop in the load demand, the second value by which the compression is increased within the second time period may possibly not be sufficient to meet the demand for a rapid increase in compression. If, therefore, the knock sensor does not respond within, especially at the end of, the second time period, the compression increase is repeated at a higher second value until the knock sensor starts responding again as the compress ratio increases. This leads again to a decrease in the second value of the compression increase to the baseline value associated with the operating state of the internal combustion engine.

In another elaboration of the invention, it is provided that operating parameters of the internal combustion engine and/or of a motor vehicle driven by the internal combustion engine are taken into consideration in the determination of the first value, of the first time period, of the second value, and/or of the second time period. Such parameters might include, for example, the rpm's of the engine; the amount of fuel injected; the position of the pedal sensor; the temperature of the air, coolant, and/or oil; the temperatures of the exhaust gas and/or catalyst; the ambient air pressure; the charging pressure; the flow rate of the intake air; the driving speed; and/or the ignition timing.

The invention is especially applicable with advantage to direct-injection engines, especially to spark-ignition engines. The invention is also applicable especially to internal combustion engines, preferably engines for motor vehicles, which are equipped with $NO_x$ storage catalysts.

BRIEF DESCRIPTION OF THE DRAWINGS

The invention is explained in greater detail on the basis of an exemplary embodiment with reference to the drawing. The single FIGURE shows the compression ratio versus time on a two-axis, orthogonal coordinate system.

DETAILED DESCRIPTION OF THE PREFERRED EMBODIMENTS

The FIGURE shows the compression ratio V versus the time t. It can be seen that the time change in the compression ratio V appears as a sawtooth-like curve K. That is, there are sections of the curve with a preferably constant positive slope and others with a preferably constant negative slope. The individual segments of the curve K can therefore also be formed by straight lines.

In the diagram shown in the figure, a dotted line L is also shown, which represents, as a curve, the knock limit, which depends on the operating state of the internal combustion engine (not shown). The line L therefore indicates the knock limit at which the knock sensor (not shown here) responds.

Beginning at an arbitrary starting value $t_0$, the knock sensor determines that the compression ratio V is below the knock limit and that good combustion is thus present. Therefore, in a first time period $t_1-t_0$, the compression ratio V is increased by a operating state-dependent value V1, so that a section of the curve K has a constant, positive slope. When, within the time period $t_1-t_0$, the knock limit is reached, that is, when the compression ratio V exceeds the knock limit L, the compression ratio V is reduced in the following, second time period $t_2-t_1$ by a second value V2, so that therefore a section of the curve K with a constant negative slope is produced. Following the second time period $t_2-t_1$ there is again a first time period $t_3-t_2$, during which the compression ratio V is again increased by an operating point-dependent value, as also done during the time period $t_1-t_0$.

It can be seen from the figure that, starting at time $t_2$, first and second time periods follow in alternation, and thus that curve sections are present which have different slopes, that is, sections where the quotients of $\Delta V$ and $\Delta t$ are different, the exact value of the slope being changed in particular as a function of the operating state of the engine.

Purely as an example, let it be assumed for the course of the compression ratio V that, during the period $t_A-t_0$, a medium load demand is made on the engine and that, during the period $t_B-t_A$, the engine is operating in response to a high load demand. The full-load range is at the lowest point of the curve. During the period $t_C-t_B$, the internal combustion engine is operating in the low load range.

During the first time period $t_{n+1}-t_n$, the compression ratio V is raised by a first value V1'. It can be seen that, at time $t_{n+1}$, the knock limit L has still not been reached. Then, in the time period $t_{n+2}-t_{n+1}$, the value by which the compression ratio V rises is increased by the value V1"; in addition, the time period $t_{n+2}-t_{n+1}$ is shorter than the first time period $t_{n+1}-t_n$. The slope in this section of the curve is therefore made steeper. At the end of this section, i.e., at time $t_{n+2}$, the compression ratio V just reaches the knock limit. Then the compression is decreased again by a second, operating point-dependent value over a second time period.

So that it is possible to adapt or change the compression ratio V, it is provided that the time at which the intake value of the combustion chamber of the engine closes is changed. If the compression is to be decreased, this point in time is shifted in the "later" direction from the baseline point. To increase the compression, the time at which the intake valve is closed is shifted in the "earlier" direction. That is, the closing time of the intake valve is changed as a function of the response of the knock sensor. Thus it is possible, especially in the upper load range, which is especially prone to knocking, to achieve the highest possible compression ratio at all times, so that the efficiency of the internal combustion engine can be favorable influenced.

What is claimed is:

1. A method for operating an internal combustion engine with at least one working piston with a variable compression ratio, which can be changed as a function of an operating state of the internal combustion engine, the method comprising the steps of: detecting, with a knock sensor, when the compression ratio is too high; reducing the compression ratio (V) when the knock limit (L) is at least reached by a first, predetermined value (V1), which is a function of the operating state, over a first, predetermined time period ($t_1-t_0$); subsequently increasing the compression ratio (V) by a second, predetermined value (V2) over a second, predetermined time period ($t_2-t_1$) until the knock limit (L) is at least reached again; and determining at least one of the first predetermined value (V1), the first time period ($t_1-t_0$), the second predetermined value (V2), and the second time period ($t_2-t_1$) as a function of load demand on the internal combustion engine.

2. A method according to claim 1, including taking operating parameters of at least one of the internal combustion engine and a motor vehicle driven by the internal combustion engine into consideration in determining at least one of the first value, the first time period, the second value, and the second time period.

3. A method according to claim 1, including lowering the compression ratio (V) by an increased second value when the knock limit (L) is at least reached within the second predetermined time period.

4. A method according to claim 3, wherein the compression ratio (V) is lowered by the increased second valve when the knock limit (L) is reached at an end of the second predetermined time period.

5. A method according to claim 1, including raising the compression ratio (V) by an increased first value (V1') when the compression ratio reaches or falls below the knock limit within the first predetermined time period.

6. A method according to claim 5, wherein the compression ratio (V) is raised when the compression ratio reaches the knock limit at an end of the first time period.

* * * * *